United States Patent [19]

Rath

[11] Patent Number: 4,533,024
[45] Date of Patent: Aug. 6, 1985

[54] AUTOMATIC ADJUSTING DEVICE FOR A BRAKE

[75] Inventor: Heinrich B. Rath, Vallendar, Fed. Rep. of Germany

[73] Assignee: Lucas Industries, Birmingham, England

[21] Appl. No.: 381,555

[22] Filed: May 24, 1982

[30] Foreign Application Priority Data

Jun. 3, 1981 [DE] Fed. Rep. of Germany ....... 3121985
May 18, 1982 [DE] Fed. Rep. of Germany ....... 3218788

[51] Int. Cl.$^3$ ..................... F16D 65/56; F16D 65/52
[52] U.S. Cl. ..................... 188/79.5 B; 188/79.5 GE; 188/79.5 P; 188/196 BA
[58] Field of Search ............. 188/79.5 R, 79.5 B, 188/79.5 GE, 79.5 GT, 79.5 SC, 196 P, 196 B, 196 BA, 328, 79.5 P, 79.5 S; 74/577 S; 192/111 A

[56] References Cited

U.S. PATENT DOCUMENTS

| 1,644,378 | 10/1927 | Hirschler | 188/79.5 GE |
| 3,913,710 | 10/1975 | Margetts | 188/196 B |
| 4,222,467 | 9/1980 | Kluger et al. | 188/196 BA |
| 4,232,766 | 11/1980 | Rupprecht | 188/196 P |

FOREIGN PATENT DOCUMENTS

| 1235163 | 2/1967 | Fed. Rep. of Germany | 188/79.5 GE |
| 1525352 | 7/1969 | Fed. Rep. of Germany | |
| 2010907 | 10/1971 | Fed. Rep. of Germany | |
| 56-18131(A) | 2/1981 | Japan | 188/79.5 GE |
| 57-8975 | 2/1982 | Japan | |
| 2099525A | 12/1982 | United Kingdom | 188/79.5 R |

Primary Examiner—Douglas C. Butler
Assistant Examiner—Richard R. Diefendorf
Attorney, Agent, or Firm—Scrivener Clarke Scrivener and Johnson

[57] ABSTRACT

A strut (40) whose effective length depends on the relative positions of two strut portions (44,46) adjustable with respect to each other is connected in parallel with a brake actuating mechanism (18). One of the strut portions (44,46) is subjected to the force of a biased adjustment member acting transversely of the longitudinal direction of the strut (40) and, upon actuation of the brake, tending to increase the length of the strut (40). The adjustment member cooperates with an intermediate member (24) which is disposed between two structural members (14",22) transmitting the actuating force (P) independently of the strut (40) and which is displaceable against the frictional resistance (Q) thereof, provided said resistance does not surpass a given value. Thus the possibility of adjustment is limited by the actuating force itself which is not transmitted by the strut and, for instance, may be hydraulic. If this actuating force surpasses a certain limit up to which any adjustment is caused only by the wear of the brake lining and not yet by elastic deformation of parts of the brake, also the frictional resistance caused by the brake actuating force and acting against displacement of the intermediate member surpasses the force of the biased adjustment member so that no adjustment is effected.

6 Claims, 9 Drawing Figures

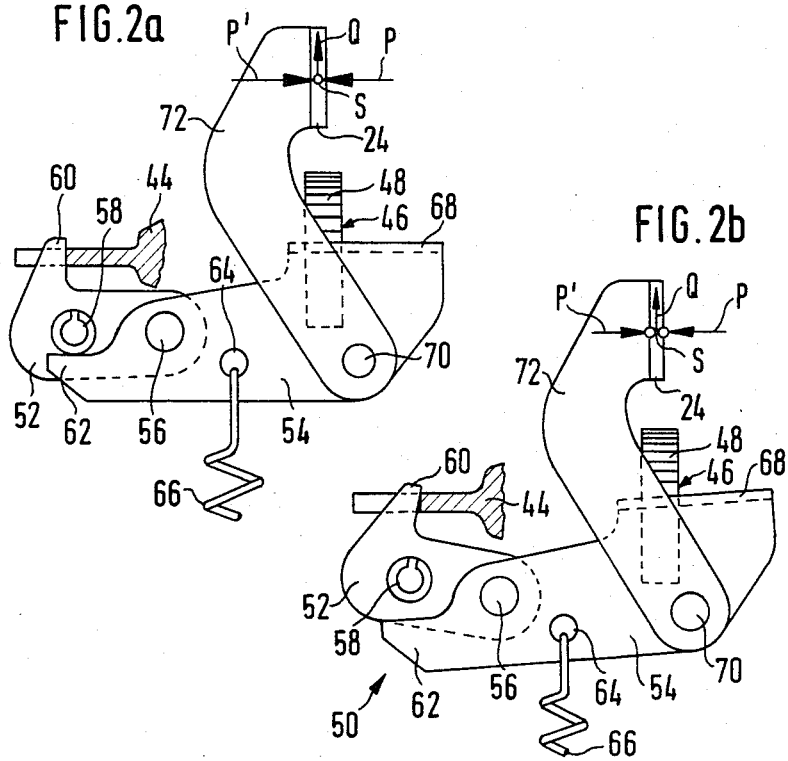

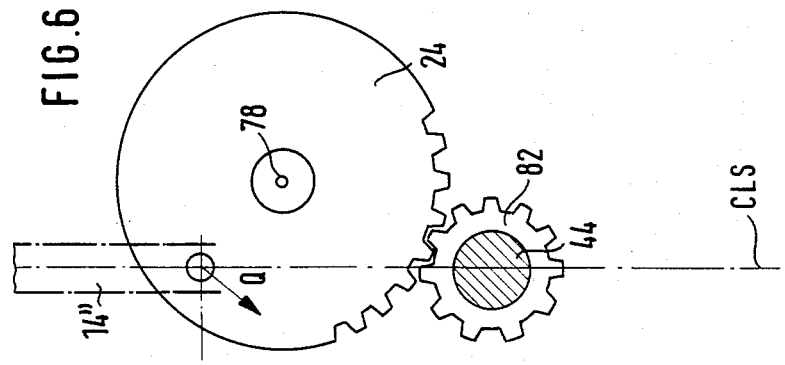
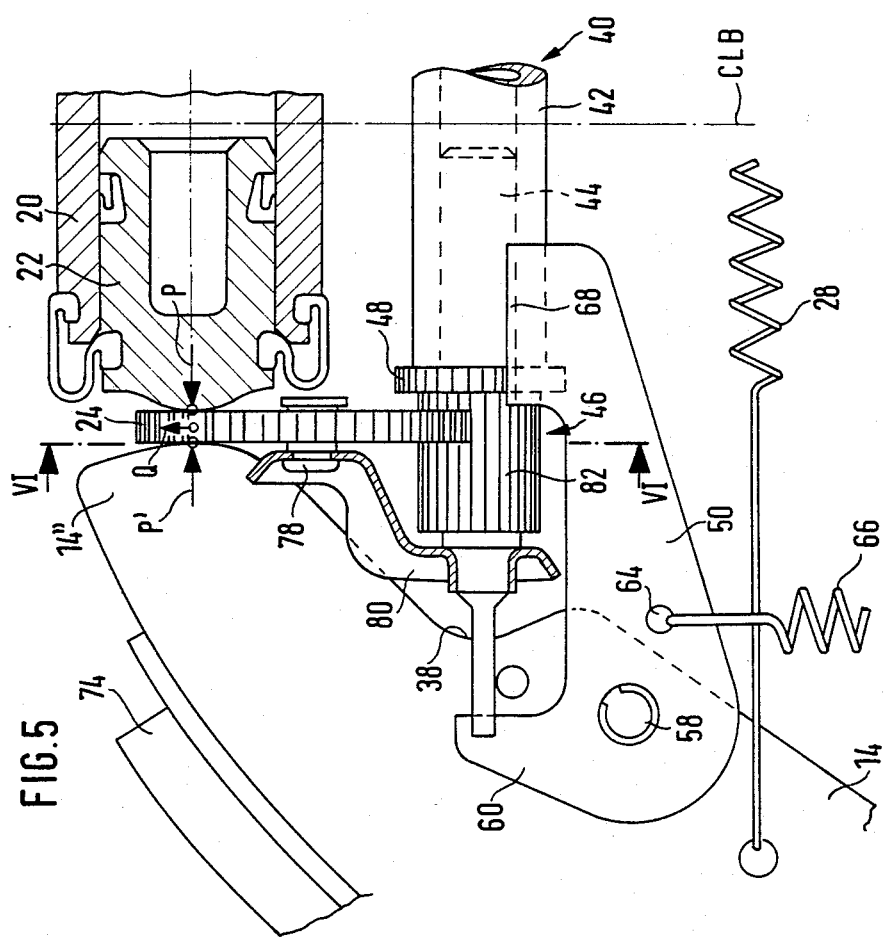

AUTOMATIC ADJUSTING DEVICE FOR A BRAKE

The invention relates to an automatic adjusting device for a brake, in particular a motor vehicle brake, in which a strut whose effective length depends on the relative positions of two strut portions adjustable with respect to each other is connected in parallel with a brake actuating mechanism, one of said strut portions being subjected to the force of a biased adjustment member acting transversely of the longitudinal direction of the strut and, upon actuation of the brake, tending to increase the length of the strut.

A great variety of adjustment devices of this kind are known in connection with motor vehicle brakes. DE-OS No. 20 10 907, for example, shows a drum brake with an hydraulic and a mechanical brake actuating device arranged between the brake shoes thereof. The hydraulic brake actuating device comprises a double-ended open brake cylinder secured to a brake carrier and containing two pistons which press against two opposed brake shoe ends upon hydraulic brake actuation. A lever belonging to the mechanical brake actuating device is supported at one of these brake shoe ends, and this lever supports a first strut portion extending parallel to the axis of the cylinder and having a bore which extends transversely of its longitudinal direction and in which a second strut portion is displaceable. The second strut portion is wedge-shaped and comprises ratchet teeth of a saw-tooth outline at one of its flanks. Complementary teeth are formed at a thrust bearing fixed to that brake shoe which is disposed opposite the brake shoe carrying the lever. The toothings are interengaged at first such that the total length of the strut resulting from the relative positions of the two strut portions is as short as possible. One end of a tension spring is hooked up in the wedge-shaped second strut portion, while the other end is hooked up at the brake shoe carrying the thrust bearing. The tension spring constitutes a biased adjustment member tending to displace the wedge-shaped strut portion such that the teeth thereof slide over the teeth of the thrust bearing so as to increase the effective length of the strut. A return spring holding the strut under tension between the two brake shoes, thereby causing resistances against any displacement of the wedge-shaped strut portion, is opposed to this tendency when the brake is not actuated. However, if the hydraulic brake actuating device spreads the two brake shoe ends in question by a distance which is greater than a predetermined value because of the wear of the brake linings which has occurred, then the spring provided as the adjustment member becomes effective to displace the wedge-shaped strut portion. With this known adjustment device there is a risk that adjustment is effected because of excessive hydraulic brake actuation resulting in an elastic deformation of various parts of the brake although the actual status of wear of the brake linings does not yet justify such an adjustment.

Something similar may also happen with another drum brake known from DE-OS No. 15 25 352 comprising, on the one hand, a combined hydraulic and mechanical brake actuating device disposed beween the brake shoes and, on the other hand, in diametrically opposed position an adjustable stop which directly supports the end of the one brake shoe remote from the actuating device, while the corresponding end of the other brake shoe is supported at a threaded rod which is fixed against rotation and screwed into a nut rotatably supported in the stop. The outside of the nut is formed with ratchet teeth cooperating with one end of a pawl which is supported for rotation at the one brake shoe and has an end remote from the ratchet teeth and normally held in abutment against a strut by a biased spring in the vicinity of the brake actuating device. The strut is secured to the other brake shoe. With this known adjusting device the biased spring loading the pawl is to have a characteristic which prevents undue adjustment. Yet this aim cannot be achieved unless close manufacturing tolerances are observed and no alterations worth mentioning of the decisive parameters, such as the resistance against rotation of the nut occur in operation. In practice, these conditions hardly can be met.

Therefore, it is the object of the invention to develop an automatic adjusting device of the kind specified initially such that undue adjustment is prevented most positively.

This object is met, in accordance with the invention, in that the adjustment member cooperates with an intermediate member which is disposed between two structural members transmitting the actuating force independently of the strut and which is displaceable against the frictional resistance thereof, provided said resistance does not surpass a given value.

In accordance with the invention, therefore, the possibility of adjustment is limited by the actuating force itself which is not transmitted by the strut and, for instance, may be hydraulic. If this actuating force surpasses a certain value above which considerable elastic deformation of parts of the brake takes place, also the frictional resistance caused by the brake actuating force and acting against any displacement of the intermediate member, surpasses the force of the biased adjustment member so that adjustment is not effected.

The invention is applicable in brakes of the most varied kind, above all in motor vehicle brakes, in the first place in drum brakes having internal brake shoes. The field of application of the invention embraces adjusting devices including wedge-shaped strut portions which are displaceable with respect to each other as well as strut portions which are in mutual threaded engagement.

A preferred embodiment of the invention relates to an adjusting device of the kind specified initially with which the strut comprises two strut portions in threaded engagement, e.g. a threaded rod and a threaded nut. One of these portions is fixed against rotation, while the other one is supported rotatably and provided with ratchet teeth engaged by an adjustment member which is embodied by a pawl loaded by an adjustment spring. In this kind of adjusting device the intermediate member preferably is supported pivotably at the pawl.

The adjusting device described above is particularly well suited for use in a drum brake including internal brake shoes and having the pawl supported at one brake shoe and formed with an extension which is held in abutment against the strut by the adjustment spring. The pawl preferably is composed of two pawl portions which are pivotable with respect to each other to a limited extent and one of which is formed with the extension, while the other one engages in the ratchet teeth and carries the intermediate member. This further development of the invention has the advantage that under any circumstances the strut is loaded by the adjustment spring, thus being prevented from rattling, even if the intermediate member is clamped firmly by the brake actuating force transmitted.

Another embodiment of the invention with which the intermediate member is provided with teeth and held in engagement with a pinion formed at the threaded portion which is supported for rotation, is suitable as well for an adjustment device of the kind specified initially in which the strut comprises two threaded portions in mutual threaded engagement, one of these portions being fixed against rotation, while the other one is supported rotatably. In this embodiment the intermediate member may be designed as a rack and guided for displacement in its longitudinal direction. However, it is particularly convenient to design the intermediate member as a gear and support it for rotation at an arm which projects away from the strut.

One of the two structural members between which the intermediate member is disposed may be a head of a plunger guided for axial displacement in the other one of these structural members and supported by means of a spring which tends to maintain a spacing greater than the thickness of the intermediate member between the head and the other structural member.

This arrangement has the advantage that small and medium actuating forces cannot obstruct movements of the intermediate member and, consequently, do not impede necessary adjustments. Yet if the actuating force surpasses a certain value at which it must be expected that parts of the brake which should be rigid become deformed elastically, the spring supporting the plunger is overcome and the intermediate member is clamped firmly so that it will prevent any adjustment.

The intermediate member may be made of a material which expands or deforms under heat such that the space occupied by the intermediate member in axial direction of the brake actuating mechanism is noticeably greater when the brake is hot than when it is cold.

Such an intermediate member which is responsive to heating has the advantage that adjustment is avoided not only upon excessive actuation of the brake but also when the brake becomes very hot which may occur when the brake, although not being actuated strongly, is actuated gently over extended periods of time.

Embodiments of the invention will be described in greater detail below, with reference to diagrammatic drawings, in which:

FIG. 2a is an enlarged view of a structural group shown in FIG. 1;

FIG. 2b is a view of the same structural group in a different operating position;

FIG. 3 is a sectional view along line III—III in FIG. 1;

FIG. 4 is a sectional view along line IV—IV in FIG. 1;

FIG. 5 is a partial view, partly in section, of a variant of the drum brake shown in FIG. 1;

FIG. 6 is a sectional view along line VI—VI in FIG. 5;

Figure 1:
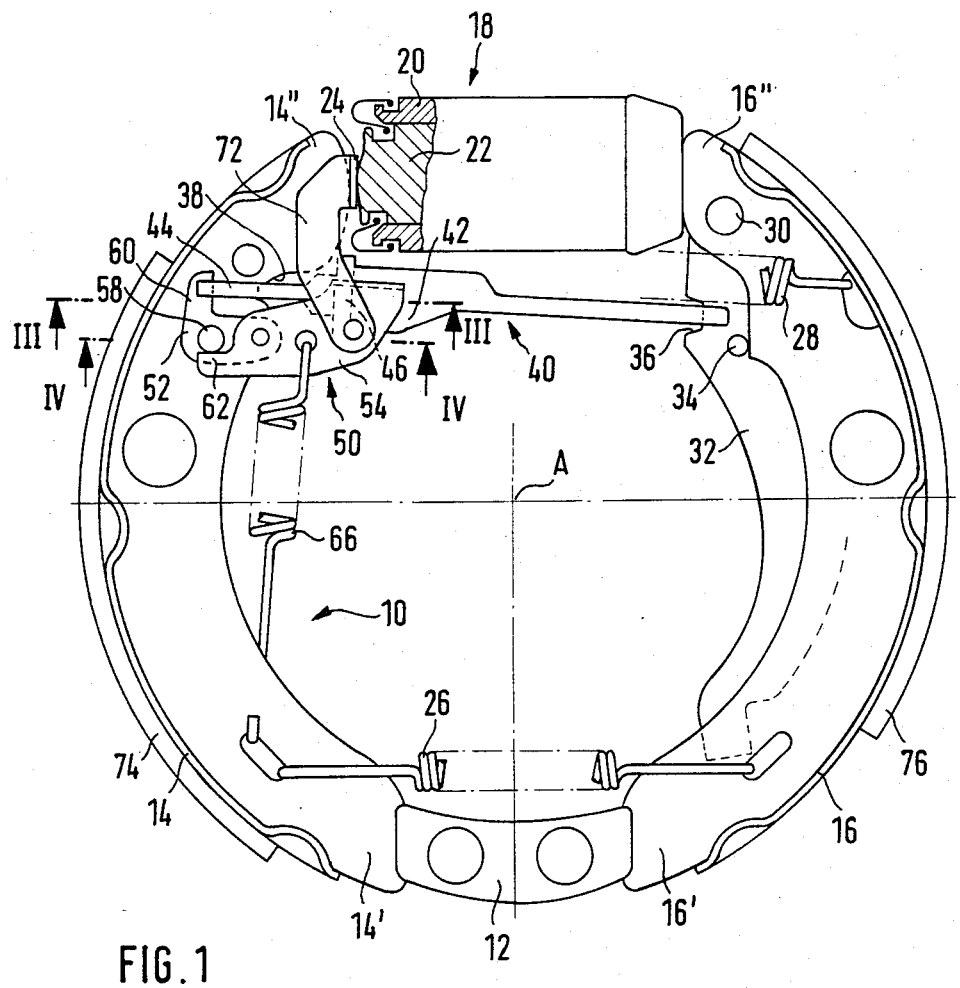
FIG. 1 is a side elevational view, partly in section, of a drum brake without the respective brake drum and showing the brake carrier member in part only.

The drum brake shown in FIG. 1 has a plate- or key-shaped brake carrier member 10 which serves for fixing to a rear wheel axle of a motor vehicle. A thrust bearing 12, shown at the bottom of FIG. 1, is secured to the inner side of the brake carrier member 10 which, in installed condition, will be enclosed by a brake drum. Two brake shoes 14 and 16 are pivotably supported by their lower ends 14' and 16', respectively, at this thrust bearing. An hydraulic brake actuating mechanism 18 is disposed diametrically opposite the thrust bearing 12 between the upper brake shoe ends 14'' and 16''. The principal components of this brake actuating mechanism are a double-ended open cylinder 20 fixed to the brake carrier member 10 and two pistons 22 of which only one is shown. The piston 22 shown acts by way of a plate-shaped intermediate member 24 on the brake shoe end 14''. The other piston, on the other hand, abuts directly against the brake shoe end 16''. Both brake shoes are biased by two return springs 26 and 28 in the direction of the thrust bearing 12 and of the brake actuating mechanism 18.

At the brake shoe end 16'' a rivet 30 supports a lever 32 which forms part of a mechanical brake actuating mechanism and which is held in abutment against the brake shoe 16 by means of a stop 34 formed at the lever, as shown in FIG. 1, as long as the mechanical brake actuating mechanism is inoperative. Spaced from the rivet 30 the lever 32 is formed with a notch 36 positioned opposite a notch 38 which is formed in the brake shoe 14. A strut 40 composed of three strut portions 42, 44, and 46 is supported in these two notches 36 and 38. The slotted right end of the strut portion 42, as seen in FIG. 1, engages in the notch 36, and the other end portion is designed like a sleeve. The left end, likewise slotted, of the strut portion 44, as seen in FIG. 1, engages in the notch 38, and the right portion is designed as a threaded rod. The strut portion 46 is designed as a threaded nut screwed on the strut portion 44 and rotatably supported at the sleeve-like strut portion 42. Ratchet teeth 48 are formed at the outer circumference of the strut portion 46.

A pawl 50 is associated with the strut 40. In the embodiment shown in FIGS. 1 to 4 the pawl is composed of two pawl portions 52 and 54 connected to each other by a rivet 56. The pawl portion 52 is pivotably supported at the brake shoe 14 by means of a rivet 58 and has an extension 60 which is supported at the strut portion 44, as seen in FIG. 3. The pawl portion 54 has a projection 62 which normally abuts against a rivet 58, as seen in FIGS. 1 and 2a, thereby preventing pivoting of the pawl portion 54 in clockwise sense with respect to the pawl portion 52. One end of an adjustment spring 66 embodied by a tension spring is hooked in a hole 64 formed in the pawl portion 54, while the other end of the spring is suspended from the brake shoe 14. The pawl portion 54 furthermore has an edge 68 bent at an angle and engaging in the ratchet teeth 48. Finally, the pawl portion 54 supports an arm 72 by means of another rivet 70, and the plate-shaped intermediate member 24 is formed integral with the end of this arm.

All the rivets 30, 56, 58, and 70 described extend parallel to the axis A of the drum brake which coincides with the axis of rotation of the associated brake drum (not shown). Consequently the pivot planes of all structural members supported by the rivets in question extend at right angles with respect to the axis A. The longitudinal axis of the cylinder 20 and thus the direction of the actuating forces P adapted to be exerted on the brake shoe ends 14'' and 16'' by the hydraulic brake actuating mechanism 18 extends radially spaced from the axis A and perpendicular to the same. The return springs 26 and 28 as well as the strut 40 are arranged at least approximately parallel to the cylinder axis. The adjustment spring 66, on the othe hand, extends approximately at right angles with respect to the axis A and the cylinder axis B.

Brake linings 74 and 76 are fixed to the brake shoes 14 and 16. The description below will start from the assumption that these brake linings are partly worn and that no adjustment has taken place as yet. If the hydraulic brake actuating mechanism 18 then actuates the drum brake, the pistons 22 exert actuating forces P on the brake shoe ends 14" and 16", causing forces of reaction P'. The plate shaped intermediate member 24 disposed between the brake shoe end 14" and the associated piston 22 is subjected to the brake force P and the force of reaction P'; both forces P and P' together cause a frictional resistance Q which is opposed to displacement of the intermediate member 24 transversely of the forces P and P'. Its magnitude is $$Q=(P+P')\cdot \mu =2\cdot P\cdot \mu .$$

In admissible simplification it is assumed that the coefficient of friction $\mu$ is the same between the intermediate member 24 and the brake shoe end 14", on the one hand, and the piston 22, on the other hand.

As long as the frictional resistance Q which is dependent on the actuating forces P, as explained above, does not surpass a given value, it cannot prevent the adjustment spring 66 from pivoting the pawl 50 as a whole in clockwise sense, as seen in FIG. 1, as soon as the brake shoe end 14" is pushed away from the left end of the strut 40, as seen in FIG. 1, as a result of hydraulic actuation of the brake. In this case the force exerted by the adjustment spring 66 is sufficient to overcome the frictional resistance Q so that the intermediate member 24 will slide a little in downward direction between the brake shoe end 14" and the corresponding piston 22. The edge 68 of the pawl portion 54 engaging in the ratchet teeth 48 takes part in this downward movement so that the strut portion 46 designed as a threaded nut, is rotated whereby the strut portion 44, designed as a threaded rod, is screwed out of the sleeve-like strut portion 42, thereby increasing the total length of the strut 40. The magnitude of the pivoting motion executed by the overall pawl 50 is limited by the cooperation between the extension 60 and the left end of the strut portion 44, as seen in FIG. 1.

As soon as the hydraulic brake actuating mechanism 18 is depressurized, the return springs 26 and 28, particularly the latter, pull the brake shoes 14 and 16 against the two ends of the strut 40, the pawl 50 as a whole being swung back into its starting position according to FIG. 1 and the edge 68 jumping over one or more of the ratchet teeth 48.

When the hydraulic brake actuating mechanism 18 again actuates the drum brake according to FIGS. 1 to 4, the adjustment spring 66 again tends to pivot the pawl 50 as a whole in clockwise sense. However, as the strut 40 was previously extended, the brake shoes 14 and 16 begin their path of actuation from positions which are displaced further to the outside so that they will engage the brake drum after having overcome a small brake release clearance. For this reason not only the actuating forces P but, accordingly, also the forces of reaction P' rise rapidly and, as a consequence, the frictional resistance Q rises correspondingly. Now the adjustment spring 66 can no longer overcome the frictional resistance Q which tends to hold the intermediate member in its original position between the brake shoe end 14" and the corresponding piston 22. The rivet 70 consequently comes to act as a stationary axis of rotation for the pawl portion 54 which thus is pivoted in anti-clockwise sense, as seen in FIG. 2b, by the adjustment spring 66, whereas the pawl portion 52 pivots—now alone—about the rivet 58 as it did during the preceding brake condition. These pivoting motions of the two pawl portions 52 and 54 in opposite directions, causing the pawl 50 as a whole merely to become bent, have the effect that, on the one hand, the pawl portion 52 with its extension 60 remains in abutment against the left end of the strut 40, as seen in FIGS. 1 to 4, thus preventing the same from rattling, and that, on the other hand, the edge 68 of the pawl portion 54 no longer moves in downward direction but instead adopts a slightly oblique position, as shown in FIG. 2b, without being able to rotate the strut portion 46 in the form of a threaded nut. Consequently an adjustment of the strut 40 is not effected.

The movements described may require minor pivoting motions of the arm 72 about an axis S extending parallel to the axis A between the points of contact of the intermediate member 24 and the brake shoe end 14", on the one hand, and the corresponding piston 22, on the other hand. These pivoting motions are permitting readily since the opposed front end faces of the brake shoe end 14" and of the corresponding piston 22 are crowned in the usual manner so that the intermediate member 24 can roll off the same.

FIGS. 5 and 6 show only those parts of a modified embodiment required to understand the differences as compared to FIGS. 1 to 4. These differences above all relate to the intermediate member 24, the strut portions 44 and 46, and the pawl 50. The structural elements shown in FIGS. 5 and 6 are marked by the same reference numerals as the corresponding structural elements in FIGS. 1 to 4.

As may be taken from FIGS. 5 and 6, the plate-shaped intermediate member 24 disposed between the brake shoe end 14" and the corresponding piston 22 is designed as an external gear and supported for rotation at an arm 80 by means of a rivet 78. The rivet 78 and thus the axis of rotation of the intermediate member 24 extend spaced from and parallel to the axis of the cylinder 20. The arm 80 in turn is supported on the strut portion 44 designed as a threaded rod. However, the arm is formed such that the brake shoe 14 prevents it from carrying out any greater pivoting movements about the axis of this strut portion. In an area located axially next to the ratchet teeth 48, the strut portion 46 serving as threaded nut is designed as a pinion 82. The teeth of the intermediate member 24 and of the pinion 82 are in meshing engagement. Consequently the strut portion 46, serving as threaded nut, cannot rotate unless the intermediate member 24 is not prevented from rotating. Adjustment, therefore, is effected only when the retarding torque exerted by the frictional resistance Q on the pinion 82 through the intermediate member 24 is smaller than the driving torque exerted by the adjustment spring 66 on the ratchet teeth 48 through the pawl 50.

The pinion 82 is much wider in axial direction than the intermediate member 24 so that the engagement between the teeth of the pinion and of the intermediate member is upheld in the course of the gradual extension of the strut 40. FIG. 5 shows the pawl 50 to be of one-piece design; yet it could also be composed of two pawl portions articulated with respect to each other in the same manner as shown in FIGS. 1 to 4.

Figure 8:
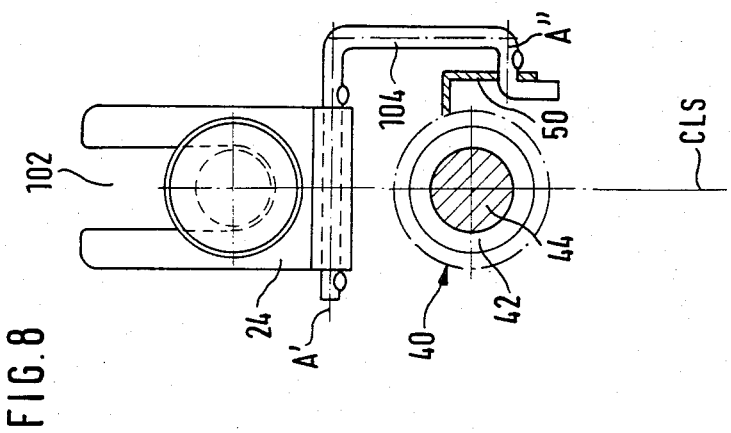
FIG. 8 is a sectional view along line VIII—VIII in FIG. 7.
Figure 7:
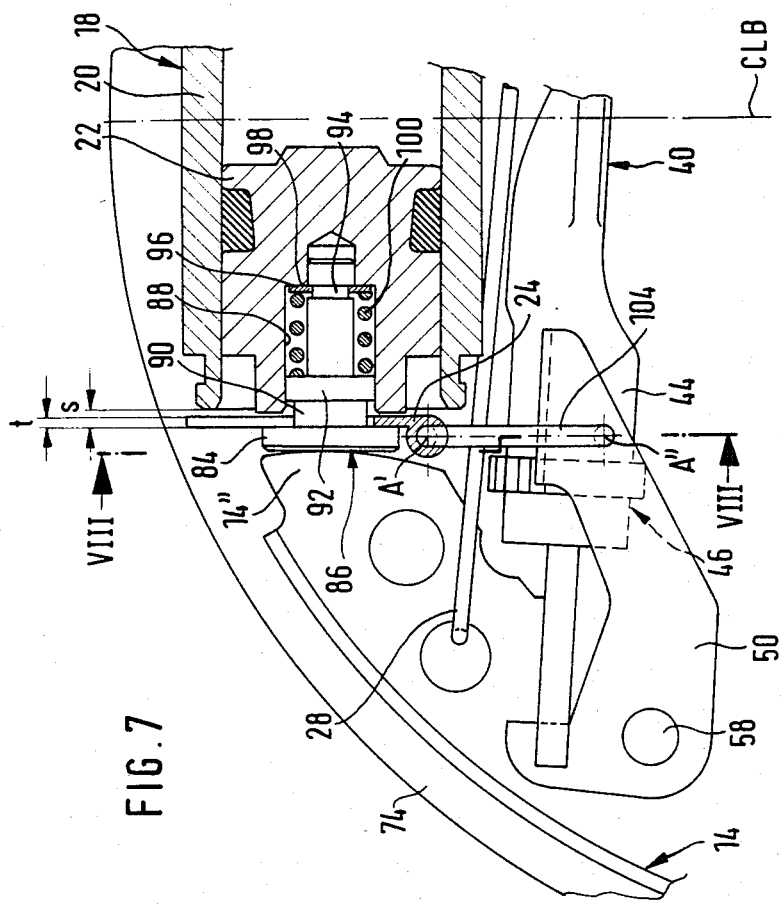
FIG. 7 is a partial view, partly in section, of another variant of the drum brake shown in FIG. 1.

For easier orientation the central line CLB of the brake intersecting the axis A at right angles and the central plane CLS of the brake shoes 14 and 16 which is normal to the axis A are indicated in FIGS. 5 and 6 as well as 7 and 8, respectively. FIGS. 7 and 8 show those features which may be added to the features described with reference to FIGS. 1 to 4 or to part of those features. The additional features relate to the intermediate member 24 and its cooperation with the piston 22, on the one hand, and the pawl 50, on the other hand. In FIGS. 7 and 8 corresponding structural members are marked by the same reference numerals as in FIGS. 1 to 4.

The piston 22 according to FIG. 7 does not act directly on the brake shoe end 14'' but instead through the intermission of a head 84 of a plunger 86 which is guided for displacement in an axial bore 88 of the piston 22. The plunger 86 has a neck 90, a shoulder 92 and, further inside, an annular groove 94 in which an abutment disc 96 of horse-shoe shape is adapted to be displaced axially to a limited extent.

The abutment disc 96 abuts against a step 98 formed in the bore 88. A helical compression spring 100 is biased between the shoulder 92 and the abutment disc 96.

As shown in FIGS. 7 and 8, the intermediate member 24 is a fork-like plate formed with a slot 102 through which passes the neck 90 of the plunger 86. As in the case of FIGS. 1 to 4, the arm 72 shown there might be used to establish the necessary connection between the intermediate member 24 and the pawl 50. However, FIGS. 7 and 8 show the intermediate member 24 to be supported by a bow-shaped wire strap 104 so as to be pivotable about an axis A'. The wire strap itself is supported by the pawl 50 for pivoting motion about an axis A''. The axes A' and A'' extend parallel to the axis A of the brake. This double joint connection with the pawl 50 prevents any canting of the intermediate member 24.

The compression spring 100 tends to maintain a spacing s greater than the thickness t of the intermediate member 24 between the piston 22 and the head 84. This spacing s is maintained in inoperative position as well as upon hydraulic actuation of the brake as long as the piston 22, acting through the compression spring 100 and the plunger 86 on the brake shoe end 14'', exerts a force which is smaller than the bias of the compression spring 100. As long as this is the case, the intermediate member 24 is not obstructed in its downward movement. Consequently, any pivoting motion of the pawl 50 required to adjust the strut 40 is not obstructed either.

However, when the actuating force exerted by the piston 22 exceeds the force of the compression spring 100, the intermediate member 24 is clamped firmly between the piston 22 and the head 84 of the plunger 86 so that adjustment is not effected.

In the embodiment according to FIGS. 7 and 8 the intermediate member 24 may be a kind of bimetal spring which bulges to such an extent when the brake becomes very hot that it is clamped firmly between the head 84 of the plunger 86 and the piston 22 even if the latter adopts the position shown in FIG. 7.

I claim:

1. An automatic adjusting device for a brake, in particular a motor vehicle brake, in which a strut (40) whose effective length depends on the relative positions of two strut portions (44, 46) adjustable with respect to each other is connected in parallel with a brake actuating mechanism (18), one of said strut portions being subjected to the force of a biasing adjustment member acting transversely of the longitudinal direction of the strut (40) and, upon actuating of the brake, tending to increase the length of the strut (40), the adjustment member cooperating with an intermediate member (24) which is disposed between and frictionally engaged by two structural members (14'', 22) transmitting the actuating force (P) independently of the strut (40) and which is displaceable against the frictional resistance (Q) of said two structural members provided said resistance does not surpass a given value, the strut (40) comprising two strut portions (44, 46) which are threadedly engaged and one of which is fixed against rotation while the other one is supported rotatably and provided with ratchet teeth (48) engaged by an adjustment member embodied by a pawl (50) having a pivot axis and loaded by an adjustment spring (66), characterized in that the intermediate member (24) is pivoted at the pawl (50) at a distance from said pivot axis.

2. The adjusting device as claimed in claim 1 for a drum brake including internal brake shoes (14,16) on one (14) of which the pawl (50) is supported, which pawl has an extension (60) normally held in abutment against the strut (40) by the adjustment spring (66), characterized in that
    the pawl (50) is composed of two pawl portions (52,54) which are pivotable with respect to each other to a limited extent and one (52) of which includes the extension (60), while the other one (54) engages in the ratchet teeth (48) and carries the intermediate member (24).

3. An automatic adjusting device for a brake, in particular a motor vehicle brake, in which a strut whose effective length depends on the relative positions of two strut portions adjustable with respect to each other is connected in parallel with a brake actuating mechanism, one of said strut portions being subjected to the force of a biased adjustment member acting transversely of the longitudinal direction of the strut and, upon actuating of the brake, tending to increase the length of the strut, the adjustment member cooperating with an intermediate member which is disposed between and frictionally engaged by two structural members transmitting the actuating force independently of the strut and which is displaceable against the frictional resistance of said two structural members provided said resistance does not surpass a given value, characterized in that one of the two structural members (22, 84) between which the intermediate member (24) is positioned is the head (84) of a plunger (86) guided for axial displacement in the other one (22) of the structural members (22, 84) and supported by means of a spring (100) tending to maintain a spacing (s) larger than the thickness (t) of the intermediate member (24) between the head (84) and the other structural member (22).

4. The adjusting device as claimed in claim 3, characterized in that the spring (100) is clamped between a shoulder (92) of the plunger (86) and an abutment disc (96) which is supported at the other structural member (22) and axially displaceable to a limited extent.

5. The adjusting device as claimed in claim 3, characterized in that the plunger (86) has a neck (90) passing through a slot (102) formed in the intermediate member (24).

6. The adjusting device as claimed in one of claims 1 or 3, characterized in that the intermediate member (24) is made of a material which expands or deforms when heated such that the space occupied by the intermediate member in axial direction of the brake actuating mechanism (18) is noticeably greater when the brake is hot than when it is cold.

* * * * *